Jan. 15, 1935.  P. B. FLANDERS  1,988,001
VIBRATION TRANSLATING SYSTEM
Filed Aug. 19, 1932   2 Sheets-Sheet 1
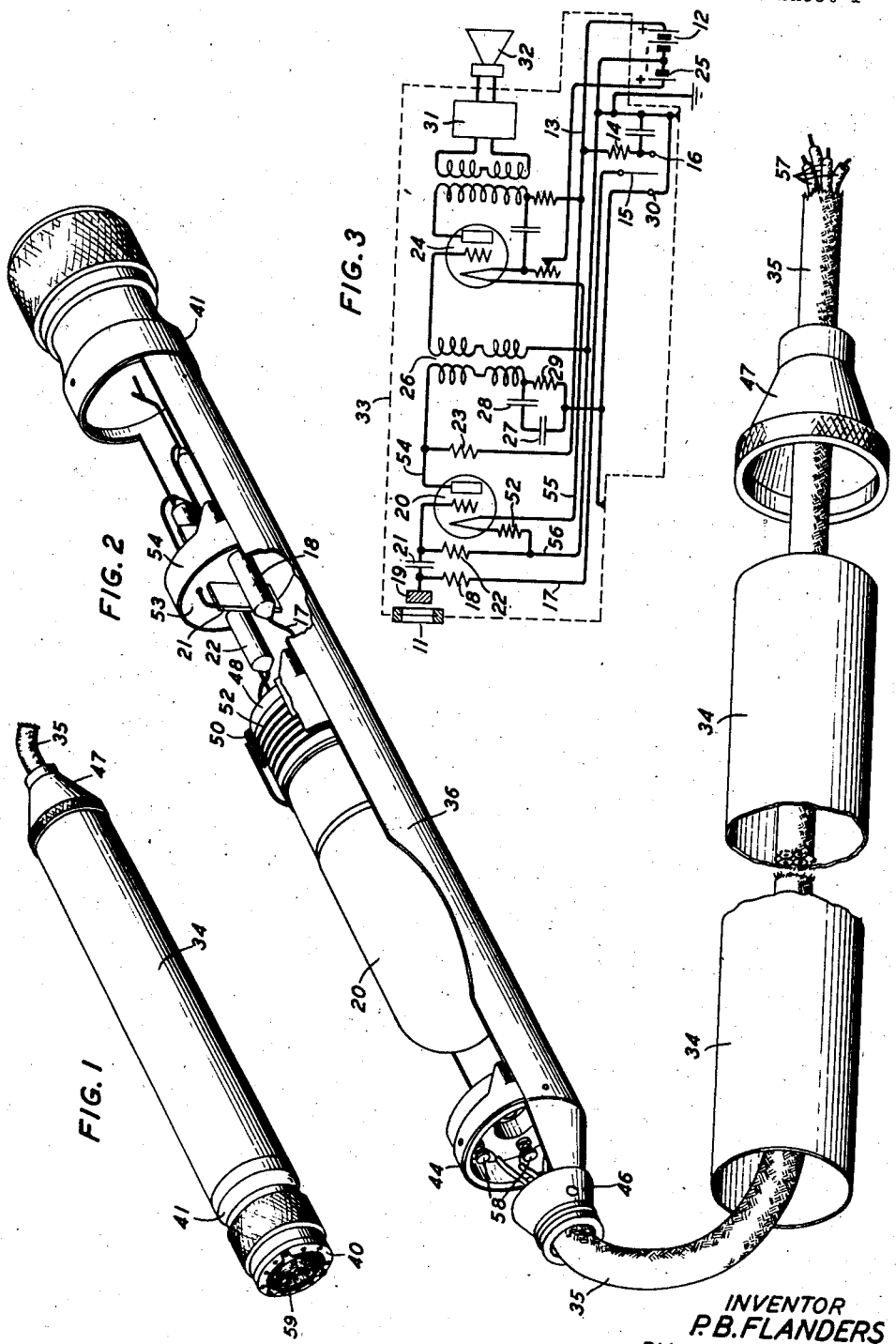
INVENTOR
P. B. FLANDERS
BY
ATTORNEY Jan. 15, 1935.                P. B. FLANDERS                1,988,001
                         VIBRATION TRANSLATING SYSTEM
                            Filed Aug. 19, 1932          2 Sheets-Sheet 2
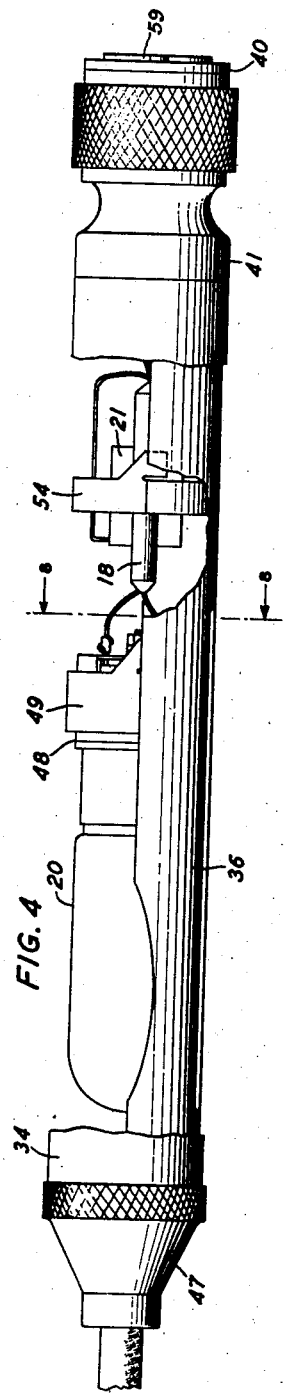
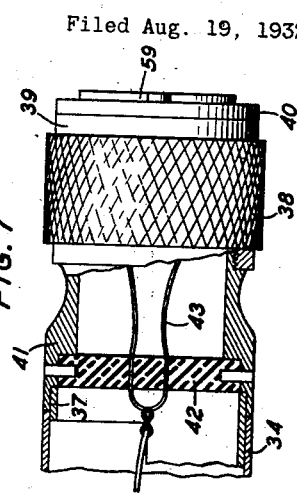
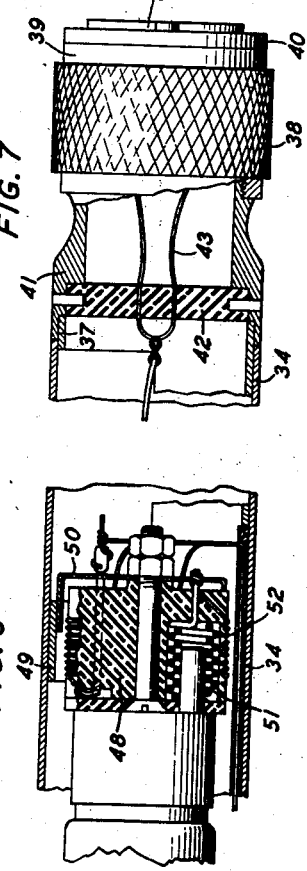
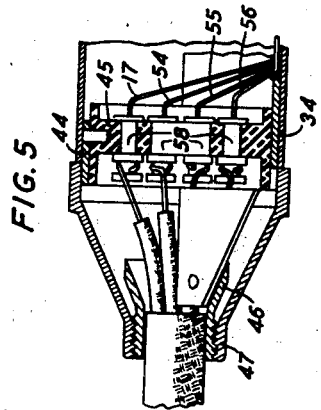
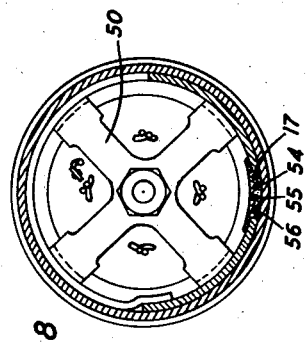
INVENTOR
P. B. FLANDERS
BY
ATTORNEY Patented Jan. 15, 1935

1,988,001

UNITED STATES PATENT OFFICE 1,988,001

VIBRATION TRANSLATING SYSTEM

Paul B. Flanders, East Orange, N. J., assignor to Bell Telephone Laboratories, Incorporated, New York, N. Y., a corporation of New York Application August 19, 1932, Serial No. 629,488

4 Claims. (Cl. 179—1)

This invention relates to vibration translating systems and more particularly to condenser transmitters and their associated amplifiers adapted for use in high quality systems.

When the best quality reproduction of speech and music is desired, a transmitter or microphone of the condenser type is commonly used and due to the very low level of the output of these devices, it is very desirable that there be closely associated with the transmitter an amplifier of sufficient power to raise its output to a level where it will be less affected by extraneous pick-up while being transmitted to the other parts of the system.

It is accordingly the usual practice in the art to make up an amplifier and a microphone in a single rather bulky unit which is mounted in some convenient position with respect to the sound source. In Patent No. 1,934,416 granted to P. B. Flanders and H. C. Harrison Nov. 7, 1933, it is explained that a uniform response over a wide range of frequencies is difficult to obtain when the pick-up transmitter is of the usual size because of the disturbance it causes in the sound field. Briefly stated, the difficulty is that the diameter of the transmitter used is equal to the quarter wave length of a frequency within the range important in speech and music and waves of frequencies above this value are more or less reflected. This increases the effective pressure produced by these waves on the diaphragm and the transmitter is accordingly not uniformly responsive to all the desired frequencies. In the above patent it was proposed to make the transmitter itself so small that it does not materially alter the sound field over the range of interest and to separate it from the necessary amplifier by a tube of substantially the size of the transmitter and of sufficient length that the bulk of the amplifier does not excessively distort the field in the immediate neighborhood of the transmitter.

It is the object of the present invention to dispense with the bulky container for the amplifier entirely and to locate the amplifier immediately adjacent the transmitter without distorting the sound field.

According to the invention a very small transmitter is mounted at one end of a tube of about the same diameter and a single stage amplifier is located within the tube from the other end of which the output of the amplifier is conducted through flexible leads to the succeeding amplifier stages. In this way the transmitter amplifier unit can be made so small that it is capable of constant response over a very wide frequency range and due to the small bulk and mass of the unit, it is well adapted to be carried on the person or concealed near the sound source.

In the preferred form of the invention the amplifier is built up on a frame and the covering tubing is adapted to be pulled back over the outgoing leads to permit of inspection or repair without danger of losing any of the parts.

A further feature of the invention is means preferably remote from the transmitter for compensating for decreased efficiency at low frequencies incident to the use of a very small transmitter and coupling means of finite impedance as will be more fully explained.

These and other features of the invention will be more clearly understood from the following detailed description and the accompanying drawings in which:

Fig. 1 is an assembly of a condenser transmitter and its associated amplifier according to this invention;

Fig. 2 is a partially disassembled perspective view showing particularly the arrangement of the amplifier parts;

Fig. 3 is a circuit diagram of a system including the circuit of this invention;

Fig. 4 is a side view of the amplifier; and

Figs. 5, 6, 7 and 8 are enlarged views showing details of construction.

Referring first to the circuit diagram of Fig. 3, the condenser transmitter 11 is polarized at about 200 volts over a circuit extending from battery 12, conductor 13, resistor 14, key 15 when closed on contact 16, conductor 17 and resistor 18 to back electrode 19 of the transmitter. When not in use, key 15 is closed on contact 30 to ground the electrode. This electrode is connected to the grid of vacuum tube 20 through a suitable stoppage condenser 21 and the grid is given the proper negative bias by the voltage drop in the resistor 52. Plate voltage for the tube 20 is also supplied by battery 12 through resistor 23 and the filaments of this tube and tube 24 are energized by battery 25.

The plate circuit of tube 20 is coupled to the grid circuit of tube 24 by means of transformer 26, the primary of which is tuned by means of condensers 27, 28 and resistance 29 to resonate at low frequencies and thereby improve the overall response of the translating system. The need for some such compensating arrangement is due to that fact it is impractical to make a very small condenser transmitter uniformly responsive down to very low frequencies. Ideally such a transmitter should work into an infinite impedance but practical considerations, such as stability under normal variations in operating conditions, limit the value of resistances 18 and 22 to something of the order of 200 megohms. Moreover, as is well known in the art vacuum tubes cannot be designed to work satisfactorily in a circuit of more than a certain impedance. Applicant's resistors 18 and 22 are therefore preferably made of the order of 80 megohms and the loss at low frequencies thereby occasioned is compensated by the resonant circuit already described.

The output of tube 24 is conducted in the usual manner through an amplifier 31 having the desired number of additional stages from which it may be used to operate a receiver 32 or any other translating device. The dotted line 33 indicates grounded shielding for the conductors including the housing 34 and flexible shielding 35 on the conductors leading to the second amplifier stage which is preferably located at some distance from the transmitter.

The detail construction of the amplifier within the housing 34 will now be described. The main supporting frame 36 (Fig. 2) is of semi-circular cross-section terminating at one end in a ring 37 (Fig. 7) which forms an attachment member for the transmitter assembly 38. As described more in detail in the patent referred to above, this transmitter has a thin duralumin diaphragm prestretched to a very high tension and secured to the housing 39 by a thin clamping ring 40 which may be about ¾ inch diameter or even less. The thin diaphragm is preferably protected from mechanical injury by a wire mesh guard 59. The transmitter is secured to the frame 36 by means of a connecting member 41 which contains a phenol fibre disc 42 having inserted therein a spring clamp 43 connecting the back electrode 19 electrically to the amplifier. At the other end of the frame 36 is a ring 44 to which is secured the phenol fibre terminal block 45. The frame is tapered at the end to receive the threaded connecting member 46 and when the device is completely assembled the sleeve housing 34 is held in place by the threaded member 47 engaging the ring 44 and the threads of member 46.

The vacuum tube 20 is of such small diameter that the housing 34 may be only ¾ inch in diameter or less to avoid disturbance to the sound field. One diminutive tube suitable for this purpose is disclosed in Patent 1,608,535 to Schwerin, November 30, 1926. The tube socket 48 comprises a block of phenol fibre mounted on ring 49 integral with the housing 36 by means of a flexible spider member 50 (Fig. 8). This provides a resilient mounting for the tube which makes the unit insensitive to mechanical vibrations.

The contact members preferably consist of intermeshed helical springs 51 as shown in Patent 1,884,582, granted to A. I. Crawford, Oct. 25, 1932, and the periphery of the socket 48 is spirally grooved to receive the wire constituting the grid biasing resistor 52 in Fig. 3. This arrangement conserves space and at the same time permits free radiation to the housing of the heat generated in the resistor.

The high resistances 18 and 22 preferably consist of platinum and electrodes immersed in a suitable mixture of alcohol and xylol in a glass tube. These resistances and the small condenser 21 are mounted in a disc of gum rubber 53 which is retained in position by a metal ring 54 integral with the frame 36. The conductors 17, 54, 55 and 56 are preferably grouped in the bottom portion of the frame 36 as shown in Fig. 8 and extend under the tube 20 to the binding posts 58 as shown in Fig. 5. From the binding posts, the conductors form a cable 57 to the second stage of the amplifier.

While the invention has been described for purposes of illustration with respect to a particular structure it will be understood that various modifications will occur to those skilled in the art. For example, a tube may be employed in which the grid lead enters through the end portion of the glass bulb in which case it might be an advantage to mount the tube in the reverse position from that shown. The transmitter is readily detached from the member 41 and in certain cases it may be desirable to use a transmitter of somewhat larger or smaller diameter with respect to the amplifier than the one shown.

The range of uniform response obtained with a translating unit of this type depends to some extent upon the angle of incidence at which sound waves strike the diaphragm and this in turn is determined not only by the position of the unit with respect to the sound source but also by the proportion of direct to reflected sound waves. In open air or in comparatively "dead" rooms a better characteristic is obtained at high frequencies by placing the unit with its longitudinal axis at 90° to the sound source or in other words with an angle of incidence of 90°. In "live" rooms where the reflected waves constitute a large proportion of the sound field at the transmitter, a zero angle or some intermediate position may be preferable.

The diaphragm is preferably tensioned to resonate near or only slightly above the upper limiting frequency of the band to be translated for if a materially higher tension is used the transmitter will be of correspondingly lower efficiency. At the present time, due to other limitations in sound transmission and recording and reproducing systems the resonant frequency need not be greater than 8000 to 9000 cycles but units may be readily built to respond uniformly up to 10,000 cycles or even higher. Since the unit is only about ¾ inch in diameter and 6 or 7 inches long, it may be easily concealed within the camera field of a sound picture system or made up in an inconspicuous form to harmonize with the setting being used.

What is claimed is:

1. A vibration translating unit comprising a frame, an amplifier built up on the frame, a vibration translating device mechanically secured to the frame and electrically connected to the input of the amplifier, output leads for the amplifier, and a tubular member enclosing the amplifier and adapted to be moved back over the output leads to give access to the amplifier.

2. In a vibration translating system a condenser-transmitter and an amplifier housing less than one inch in diameter so that it may be placed in a sound field without substantially distorting it within the high quality sound range, a diminutive vacuum tube within the housing, elements associating the tube and the transmitter having insufficient impedance to maintain the efficiency of the transmitter uniform at low frequencies, and means external to the housing for restoring the output of the tube for low frequencies to its proper relative level.

3. In a vibration translating unit of such small dimensions that it may be placed in a sound field without substantially distorting it for important sound frequencies, the combination with a tubular housing and a condenser transmitter mounted on the end thereof, of a diminutive vacuum tube within the housing, means for operatively coupling the transmitter to the input circuit of the tube, a resiliently mounted socket for the tube and a grid biasing resistor wound on the socket in close spaced relation to the housing.

4. In a vibration translating unit, a frame, a condenser transmitter mounted on one end of the frame, a diminutive vacuum tube, a socket therefor, a resilient mounting supporting the socket on the frame, liquid resistors coupling the transmitter to the tube, a housing enclosing the frame and a helical grid biasing resistor for the vacuum tube in close spaced relation to the housing.

PAUL B. FLANDERS.